in part discloses and claims subject
3,275,461
REFRACTORY
Ben Davies and Peter Harry Havranek, Pittsburgh, Pa., assignors to Harbison-Walker Refractories Company, Pittsburgh, Pa., a corporation of Pennsylvania
No Drawing. Filed Aug. 27, 1965, Ser. No. 483,356
15 Claims. (Cl. 106—58)

This application in part discloses and claims subject matter of copending application Serial No. 349,736 (now abandoned in favor of this application), filed March 5, 1964, entitled, "Beneficiation To Assist in Making Dense Magnesia." It further in part discloses and claims the subject matter of copending application Serial No. 383,207, (now abandoned in favor of this application), filed July 16, 1964, and entitled, "Oxygen Steelmaking." It yet further in part discloses and claims the subject matter of copending application Serial No. 440,933 (now abandoned in favor of this application), filed March 18, 1965 and entitled, "Metallurgical Furnace Lining."

This invention relates to basic refractories and more particularly to magnesia refractories and to furnaces lined with these refractories.

Refractory or dead burned magnesia, or magnesite as it is more commonly known, is one of the principal materials used in the manufacture of refractory products. These products include magnesite brick, bonding mortars, ramming and casting mixes, heat exchange elements and other products in which the magnesia is either used alone or is blended with chrome ore or other refractory materials. A particular utility for basic magnesite brick is in the lining for oxygen steel converters in which there is an inner or working lining of chemically or ceramically bonded basic brick which are usually impregnated with tar or pitch to obtain greater resistance to corrosion by the converter slag. Between the working lining and an exterior or shell lining of burned magnesite brick is usually an intermediate layer of tar bonded ramming mix with a composition similar to that of the working lining.

The basic refractories are chosen for oxygen converter linings because of their resistance to attack by the converter slags. The composition of the converter slag varies throughout the heat, the slag initially containing a large quantity of silica and low amounts of calcium and iron oxide and changing gradually until the final slag contains a high iron oxide content. The early slag would normally be described as an "acid" slag and would be expected to attack and dissolve basic refractories such as magnesite and dolomite quite readily but at this stage both the slag and the refractory lining are at their minimum process temperature and so the rate of erosion is low. About midway through the heat the slag becomes basic because of the presence of the added lime. The final slag contains the high proportion of iron oxide and its temperature also reaches its maximum at this stage when it is believed that the corrosion of the refractory lining by the slag is most severe.

The refractories most commonly used have been those consisting essentially of tar impregnated or tar bonded dead burned magnesite, dead burned dolomite or mixtures of these two materials. Sometimes, however, the magnesite and/or dolomite may have a proportion of lime mixed in with it. Both naturally occurring and synthetic dead burned magnesites are used. The present invention is particularly concerned with burned or ceramically bonded shapes, but it also includes nonburned or chemically bonded shapes.

The terms "magnesite" and "magnesia" are used interchangeably in this specification, although the term "magnesite" is really a misnomer when applied to the high density, dead burned periclase grain used in refractory brickmaking, since the latter is synthetic in origin and does not stem from magnesite rock. This invention is particularly directed to synthetic grain of the type made from magnesia values recovered from sea water, bitterns, brines, and the like and to distinguish from grain made from natural rock by dead burning.

We have now discovered that by keeping the quantity of boron in synthetic magnesite grain below certain levels and, in certain cases, also controlling the lime and silica content, magnesite refractories having improved properties can be obtained. This discovery is particularly surprising in view of the common practice in the refractories industry of adding boron in the form of boric acid, borax or other $B_2O_3$ yielding materials, to improve the hydration resistance of basic refractories. While the addition of boron does, indeed, increase the hydration resistance, we have found that it undesirably reduces the high temperature strength of such refractories.

In its broadest aspect, the present invention provides a dead burned magnesite refractory grain which is comprised of magnesia, calcia and silica, the balance being $R_2O_3$ materials and $B_2O_3$, the maximum $B_2O_3$ content being $(C+S)^2/100\%$ where C is the percentage of CaO and S is the percentage of $SiO_2$ in the grain. The magnesia constitutes at least 90%, by weight, of the grain.

In this specification all parts, percentages, proportions, and ratios are on a weight basis and all analysis figures are on the basis of an oxide analysis. All screen sizes will be given in the Tyler series of screens. The expression "$R_2O_3$ materials" has its usual significance in the refractories art, referring to materials of the group $Fe_2O_3$, $Al_2O_3$ and $Cr_2O_3$. It should be understood, of course, that all the refractories will contain minor impurities such as trace alkalies which are unavoidable under normal working conditions, although, of course, gross quantities of impurities should be avoided.

If no particular control is exerted over the lime and silica content of the grain, the $B_2O_3$ content should preferably not exceed 0.05%, but if the lime and silica contents are subject to careful control within stipulated ranges higher boron contents can be readily tolerated. In particular, if the CaO content is maintained in the range of 3 to 5% with more than 1% $SiO_2$ and a maximum of 3% $R_2O_3$ materials and a $CaO:SiO_2$ ratio of at least 2:1, the full benefits of the invention are obtained right up to the maximum boron content given by the expression $(C+S)^2/100\%$. Refractories which contain more than 5% lime encounter hydration difficulties in use and are not preferred.

If the MgO+CaO content of the grain is maintained in the range of 95 to 99% with a maximum CaO content of 3% and a maximum $SiO_2$ content of 2%, and a $CaO:SiO_2$ ratio of less than 3:1 (the remainder of the grain being the usual $R_2O_3$ content and impurities), particularly preferred refractories are obtained with a $B_2O_3$ content of up to 0.05%. However, if the $CaO:SiO_2$ ratio is more closely controlled and maintained within the range 2:1 to 3:1, up to 0.1% $B_2O_3$ can be accepted.

Fired brick can be made from the grain by forming it into shapes, generally with the addition of a binder, such as waste sulphite liquor, up to 5% of binder usually being sufficient, and then firing the shapes. If unfired chemically bonded brick are required, the grain is blended with the binder and formed into shapes which are then ready for use. In either case, the grain may be used either alone or in admixture with other refractory materials.

The grain is made by burning a batch of the requisite composition and crushing and sizing the fired product to the desired sizing. Normally, the raw batch components will be formed into briquettes before firing for ease in handling and crushing. A good process for making the grain would be that disclosed in United States Patent 3,060,000.

A typical brickmaking procedure is as follows:

The grain is sized and graded into a particular batch. A typical usable batch has the following examplary screen analysis:

| | Percent |
|---|---|
| −4 + 10 mesh | 40 |
| −10 + 28 mesh | 15 |
| −28 + 65 mesh | 15 |
| −65 mesh | 30 |

About 5% of concentrated waste sulphite liquor or any other material which can serve as a temporary binder is added to the batch and brick are then pressed at about 8000 p.s.i. The brick are then burned at 2800° F. for 10 hours to develop a ceramic bond extending throughout the body of the brick.

As noted above, the refractory magnesites useful in preparing the refractories of the present invention are available from sea water magnesia recovery plants. Operations in synthetic magnesia plants are all basically similar. Magnesium hydroxide is obtained by reacting a magnesium salt solution with calcium hydroxide; and any brine with a sufficiently high magnesium concentration, which can be treated to remove sulphates and carbonates, can be used. The calcium hydroxide can come from any high purity source, but is normally derived from calcined dolomite or limestone. The main considerations in selecting reactants are purity and economic factors relating to the proximity of suitable raw materials and markets.

The resulting magnesium hydroxide precipitate is washed with fresh water and thickened to remove calcium chloride and other minor allied compounds to form a concentrated, pure magnesium hydroxide slurry. The thickened slurry is then filtered and the magnesium hydroxide filter cake is fed into a kiln to convert it to magnesite. Both rotary and shaft kilns can be used for this step.

Additives to give the dead burned magnesite a particular chemical composition can be made to the filter cake prior to feeding it into the kilns or alternatively, additions may also be made at the feed end of the kilns. When additional CaO and $SiO_2$ are required in the refractory, lime or silica are usually added at this stage.

If the magnesia contains more boron than is permitted in the refractories according to the invention, the excess boron can be eliminated by firing the magnesia with a compound which reacts with the boron content of the magnesia under the firing conditions employed. Preferred compounds for this purpose are alkali metal, preferably sodium compounds, and the like, such as the salts of alkali metals with organic or inorganic acids. During firing, the boron in the magnesite reacts with the alkali metal compoud or a thermal decomposition product thereof to form a volatilizable alkali metal borate which escapes from the mix as a gas.

The nature of the alkali metal compound employed is not important as long as it is capable of reacting with boron in the subsequent burning and it is usually preferred to use an excess of the alkali metal compound over the stoichiometric amount required to effect the desired degree of boron removal. Usually up to 1% of alkali metal salt will be sufficient to reduce the boron to the desired level, but more than this may be employed, if desired. Most or all of any excess of alkali metal salt is volatilized during firing and is not left behind in the refractory, but as this volatilization increases the porosity of the refractory, the use of large excesses of the alkali metal salt is preferably avoided. The $B_2O_3$ content of the magnesia can be reduced still further by leaching the fired magnesia with water to remove any alkali metal borate remaining behind in the magnesia.

When sodium carbonate is used, the reaction which takes place during firing may be expressed as follows:

$$Na_2CO_3 + 2B_2O_3 = Na_2B_4O_7 + CO_2$$
$$(106) \quad 2(69.64) \quad (201.27) \quad (44)$$

In this case, therefore, at least 53 units of sodium carbonate are required for each 69.64 units of $B_2O_3$. As previously mentioned, however, an excess of alkali metal salt can be used and we have successfully employed up to ten times the theoretical amount. As examples of operable alkali metal salts other than sodium carbonate, sodium chloride and sodium fluoride may be mentioned; salts of potassium, lithium and barium can also be used.

The preferred procedure is to mix the alkali metal salt with the magnesia, form the mixed batch into shapes, usually small briquettes, and to fire the briquettes which are subsequently crushed to form the synthetic grain of this invention.

When caustic magnesia was recovered from a boron removal burning of the type just described, grain having a bulk specific gravity (BSG) of over 3.35 was obtained: the bulk specific gravity of one sample was as high as 3.45. In comparative tests in which no alkali metal salt was added to the magnesia, the bulk specific gravity was as high as 3.30 and as low as 3.19.

As indicated above, reduction of the boron content considerably improves the high temperature strength of magnesite refractories; at the same time we have not encountered any difficulties due to low hydration resistance with the low boron refractories of the present invention.

The brick, especially when used for the working lining of oxygen converters, are usually impregnated throughout with a nonaqueous, cokable carbonaceous material, such as tar or pitch. A discussion of these materials and their use in bonding refractory brick will be found in United States patent specification No. 3,070,499. The brick are particularly useful in making zoned working linings for oxygen converters, such as those described in British patent specification No. 977,784 (United States Patent 3,148,238). In such a zoned lining, the brick of the present invention are suitably used in the areas where the charged hot metal or scrap impinge upon the converter wall or again, in other areas of rapid wear. Impregnation with the carbonaceous material is suitably effected by immersing the brick in a pool of the fluid material at about 400° F. for about 30 minutes. Generally we prefer to use a coal base pitch having a softening point of approximately 150° F., although other tars or pitches, either coal or petroleum based, can be employed. In order that the invention may be more fully understood the following examples are given by way of illustration only. Further, all magnesites are synthetic magnesites:

*Examples 1–6*

Brick were made from a synthetic dead burned magnesite grain by forming the grain in a brick press, firing the brick at 2800° F. for 10 hours and then impregnating them with a coal based pitch having a softening point of approximately 150° F. The sizing of the magnesite grain was as follows:

| | Percent |
|---|---|
| −4 + 10 mesh | 40 |
| −10 + 28 mesh | 15 |
| −28 + 65 mesh | 15 |
| −65 mesh | 30 |

The oxide analyses of the batches used in the examples are given in Table 1 below together with the results of the modulus of rupture test at 2300° F. Example 1 is a preferred mix according to the invention. Example 2 is a mix according to the invention, but has a small iron oxide addition to promote sintering during the burning. Examples 5 and 6 illustrate mixes according to the invention, but Examples 3 and 4 are comparative examples.

TABLE 1

| Example No | 1 | 2 | 3 | 4 | 5 | 6 |
|---|---|---|---|---|---|---|
| Silica ($SiO_2$) | 1.35 | 1.21 | 0.8 | 1.9 | 1.9 | 1.0 |
| Alumina ($Al_2O_3$) | 0.45 | 0.35 | 0.3 | 0.5 | 0.3 | 0.43 |
| Iron Oxide ($Fe_2O_3$) | 0.55 | 1.1 | 1.3 | 0.3 | 0.3 | 0.25 |
| Lime (CaO) | 4.30 | 4.55 | 2.0 | 5.0 | 4.8 | 3.05 |
| Boron ($B_2O_3$) | 0.17 | 0.19 | 0.15 | 0.56 | 0.40 | 0.15 |
| Magnesia (MgO) | (1) | (1) | (1) | (1) | (1) | (1) |
| Lime/Silica Ratio | 3.18:1 | 3.75:1 | 2.4:1 | 2.5:1 | 2.5:1 | 3.1:1 |
| $(C+S)^2/100$ | 0.32 | 0.33 | 0.08 | 0.47 | 0.45 | 0.16 |
| Modulus of Rupture at 2,300° F. p.s.i. Average of 3 | 1,010 | 1,360 | 470 | 600 | 1,000 | 900 |

[1] Difference.

As noted, the brick of Examples 1 and 2 are made according to the present invention. The percentage of boron, calculated as $B_2O_3$, is below $(C+S)^2/100$ and a brick having a hot strength measured by modulus of rupture at 2300° F. above 1000 p.s.i. is obtained. Example 2 was made with the small iron addition to aid the sintering during the dead burning, but this small iron addition does not adversely affect the hot strength of the brick.

Example 3 is not within the scope of the invention as the percentage of boron is above $(C+S)^2/100$. There is not sufficient lime and silica within the brick to accommodate the boron and therefore the brick have poor hot strength at 2300° F.

Example 4 is not made within the teachings of this invention because the very high $B_2O_3$ content of 0.56% exceeds the $(C+S)^2/100$ of 0.46. This example demonstrates that the hot strength is not a result of having a high amount of CaO plus $SiO_2$ but the result of maintaining a relationship between the $B_2O_3$ and the CaO plus $SiO_2$.

Example 5 is made according to the teachings of this invention and contains a relatively high boron content. However, the percentage boron is still below $(C+S)^2/100$ and is accommodated. The hot strength of this brick is 1000 p.s.i.

Example 6 is made within the teachings of this invention. This example demonstrates that excellent hot strengths can be achieved with very low $SiO_2$ plus CaO when the $B_2O_3$ is very low. This example also demonstrates that as the $(C+S^2/100$ approaches the $B_2O_3$ content the hot strength declines. The best brick can be made by keeping the $B_2O_3$ well below $(C+S)^2/100\%$. However, as long as the $B_2O_3$ is kept below $$(C+S)^2/100\%$$

brick will have hot strength at 2300° F. above about 900 p.s.i.

*Examples 7 to 11*

Five batches were prepared from different magnesites, all the batches having the following screen analysis:

Percent
- −4 +28 mesh ------ 60
- −28 mesh ------ 40

50 to 60% of the −28 mesh fraction −325 mesh.

Shapes were pressed from these batches and fired. The spectrographic analyses of the batches together with the test results of the brick are given in Table 2 below.

It can be seen from these results that by maintaining the boron content below the critical maximum in Example 11, brick having very acceptable properties is produced, whereas in the brick of Examples 7 to 10 which have boron contents above this figure, the high temperature refractoriness exhibits a progressive deterioration with increasing boron content.

*Examples 12 and 13*

Two batches of different magnesites having the same screen analysis as those of Examples 7 to 11 but with the spectrographic analysis given in Table 3 below were made up into shapes and fired using the same procedure as in Examples 7 to 11.

The fired brick were tested for modulus of rupture at 2300° F. and 2600° F. and the results of testing are also given in Table 3.

TABLE 3

| Example No | 12 | 13 |
|---|---|---|
| Silica ($SiO_2$) | 2.8 | 2.3 |
| Alumina ($Al_2O_3$) | 0.3 | 0.3 |
| Iron Oxide ($Fe_2O_3$) | 0.6 | 0.2 |
| Lime (CaO) | 1.5 | 1.5 |
| Boron ($B_2O_3$) | 0.2 | 0.015 |
| Magnesia (MgO) | (1) | (1) |
| Lime/Silica Ratio | 0.53:1 | 0.65:1 |
| $(C+S)^2/100$ | 0.185 | 0.144 |
| Modulus of Rupture at 2,300° F | 150 | 940 |
| Modulus of Rupture at 2,600° F | 50 | 310 |

[1] Difference.
Analysis figures in percentages.

Example 13 is a brick according to the invention, while Example 12 is given for purposes of comparison. The importance of maintaining the boron content below the critical maximum is again amply demonstrated.

By comparing Examples 7 and 13, it can be seen that the boron content is of great importance because Example 7 is a relatively pure brick (97.37% MgO), while Example 13 contains a higher content of impurities (95.685% MgO only), but the brick of Example 7 has much poorer high temperature properties than that of Example 13.

*Examples 14 to 17*

Four batches of different magnesites were made up into brick and fired as described in Examples 7 to 11. The spectrographic analysis and the moduli of rupture at 2600° F. are given in Table 4 below. It should be noted

TABLE 2

| Example No | 7 | 8 | 9 | 10 | 11 |
|---|---|---|---|---|---|
| Silica ($SiO_2$) | 0.8 | 0.7 | 0.8 | 0.7 | 0.7 |
| Alumina ($Al_2O_3$) | 0.3 | 0.3 | 0.3 | 0.3 | 0.3 |
| Iron Oxide ($Fe_2O_3$) | 0.3 | 0.3 | 0.2 | 0.3 | 0.2 |
| Lime (CaO) | 1.1 | 1.2 | 1.1 | 1.1 | 1.1 |
| Boron ($B_2O_3$) | 0.13 | 0.094 | 0.072 | 0.05 | 0.025 |
| Magnesia (MgO) | (1) | (1) | (1) | (1) | (1) |
| Lime/Silica Ratio | 1.4:1 | 1.7:1 | 1.4:1 | 1.6:1 | 1.6:1 |
| $(C+S)^2/100$ | 0.0361 | 0.0361 | 0.0361 | 0.0324 | 0.0324 |
| Modulus of Rupture at 2,300° F. (p.s.i.) | 50 | 80 | 90 | 140 | 850 |
| Load Test, 250 p.s.i. Temp. of Failure (° F.) | 2,300 | 2,400 | 2,420 | 2,560 | (2) |

[1] Difference.
[2] No failure at 2,700° F.
NOTE: Analysis figures in percentages. Boron content decreases from Example 7 to Example 11.

that the 2600° F. modulus of rupture test is a very severe one and that all the brick in the table gave very good results in the test. All these examples are within the scope of the invention. The modulus of rupture at 2600° F. of brick outside the scope of the invention is exemplified by Example 12.

TABLE 4

| Example No. | 14 | 15 | 16 | 17 |
|---|---|---|---|---|
| Silica ($SiO_2$) | 0.9 | 1.2 | 0.9 | 0.9 |
| Alumina ($Al_2O_3$) | 0.5 | 0.6 | 0.5 | 0.4 |
| Iron Oxide ($Fe_2O_3$) | 0.3 | 0.4 | 0.3 | 0.3 |
| Lime (CaO) | 2.1 | 2.9 | 2.0 | 2.1 |
| Boron ($B_2O_3$) | 0.08 | 0.067 | 0.047 | 0.015 |
| Magnesia (MgO) | (1) | (1) | (1) | (1) |
| Lime/Silica Ratio | 2.3:1 | 2.4:1 | 2.2:1 | 2.3:1 |
| $(C+S)^2/100$ | 0.09 | 0.168 | 0.084 | 0.09 |
| Modulus of Rupture at 2,600° F. p.s.i. | 210 | 250 | 430 | 1,140 |

[1] Difference.
Analysis figures in percentages.

It should be noted that all these brick have good moduli of rupture at 2600° F., but that of Example 16 is particularly noteworthy and that of Example 17 is outstanding.

*Example 18*

This example illustrates the process for reducing the boron contents of magnesites with alkali metal salts.

0.5 and 1.0%, respectively, of sodium carbonate was added to each of two batches of a commercial dead burned magnesite of 96% MgO having a $B_2O_3$ content of 0.14%, the remainder being CaO, $SiO_2$, $Al_2O_3$ and $Fe_2O_3$. Thus the amount of sodium carbonate added was in both cases sufficient to remove all the boron as sodium borate (calculated quantity to remove 0.14% $B_2O_3$ is 0.108%).

The grain and sodium carbonate mixture was pressed into brick at 8000 p.s.i. and the brick were burned at 3050° F. In both cases the $B_2O_3$ content of the brick was reduced to 0.03%.

The brick could then be crushed to form grain which could then be used to make brick either by itself or in combination with other refractories, such as chrome ore.

*Example 19*

This example also illustrates the alkali metal salt process for reducing the quantity of boron in a dead burned magnesite.

1% NaCl, 1% NaF and 1% $Na_2CO_3$ were added to separate batches of dead burned magnesite made by the process described in United States patent specification No. 3,060,000 and the mixtures were pressed into cylindrical shapes at 10,000 p.s.i. and burned at 3050°F. The boron content was reduced from 0.12% to 0.012% in each case, a 90% reduction.

While the foregoing examples have been primarily concerned with synthetic grain, it should be understood that source material may be progenitor ores such as brucite, crude magnesite (magnesium carbonate) etc. or may be magnesia recovered from brines, bitterns and the like.

Having thus described the invention in detail and with sufficient particularity as to enable those skilled in the art to practice it, what is desired to have protected by Letters Patent is set forth in the following claims.

We claim:

1. That method of obtaining high temperature strength in ceramically bonded magnesite refractories without sacrifice of hydration resistance, consisting essentially of fabricating a refractory-brickmaking size graded batch of dead burned dense magnesite particles, said magnesite particles characterized by including at least some of each of the constituents CaO, $SiO_2$, $B_2O_3$, the remainder being $R_2O_3$ materials, there being,
   (a) up to about 1% $SiO_2$ and,
   (b) up to about 3% CaO, by weight,
   (c) the CaO:$SiO_2$ weight ratio being in the range 2:1 to less than 3:1,
   (d) $(C+S)^2/100$ being the maximum $B_2O_3$ percentage content, wherein C is the weight percentage of CaO and S is the weight percentage of $SiO_2$,
   (e) at least about 95 to 99%, by weight, of said particles being MgO plus CaO,
forming said batch into shapes, firing said shapes to obtain ceramically-bonded, dense, hydration resistant, magnesia refractory shapes.

2. That method of obtaining high temperature strength in ceramically bonded magnesite refractories without sacrifice of hydration resistance, consisting essentially of fabricating a refractory-brickmaking size graded batch of dead burned dense magnesite particles, said magnesite particles characterized by including at least some of each of the constituents, CaO, $SiO_2$, $B_2O_3$, the remainder being $R_2O_3$ materials, there being: more than 1% $SiO_2$, and up to 3% $R_2O_3$ materials, the CaO:$SiO_2$ weight ratio being at least 2:1 and the maximum $B_2O_3$ percentage content being $(C+S)^2/100$, where C is the percentage of CaO and S is the percentage of $SiO_2$ in the grain, the particles being at least about 90% MgO, by weight, on an oxide basis, forming the batch into shaped refractories, firing the shaped refractories to obtain ceramically bonded, dense, hydration-resistant magnesia refractories.

3. That method of obtaining high temperature strength in ceramically bonded magnesite refractories without sacrifice of hydration resistance consisting essentially of fabricating a refractory-brickmaking size graded batch of dead burned dense magnesite particles, said magnesite particles characterized by including at least some of each of the constituents CaO, $SiO_2$, $B_2O_3$, the remainder being $R_2O_3$ materials, there being,
   (a) up to 1% $SiO_2$ and,
   (b) up to 3% CaO, by weight,
   (c) the CaO:$SiO_2$ weight ratio being less than 3:1,
   (d) the maximum weight percentage of $B_2O_3$ being equal to $(C+S)^2/100$, wherein C equals the weight percentage of CaO present and S equals the weight percentage of $SiO_2$, but there being less than 0.05% $B_2O_3$,
   (e) there being from 95 to 99% MgO+CaO,
forming said batch into shapes, firing said shapes to obtain ceramically bonded, dense, hydration resistant, magnesia refractory shapes.

4. That method of obtaining high temperature strength in ceramically bonded magnesite refractories without sacrifice of hydration resistance consisting essentially of fabricating a refractory-brickmaking size graded batch of dead burned dense magnesite particles, said magnesite particles characterized by including at least some of each of the constituents CaO, $SiO_2$, $B_2O_3$, the remainder being $R_2O_3$ materials, there being,
   (a) up to 1% $SiO_2$ and,
   (b) up to 3% CaO, by weight,
   (c) the CaO:$SiO_2$ ratio being less than 3:1,
   (d) there being $B_2O_3$ in the range 0.05 to 0.1% and the maximum percentage $B_2O_3$ being equal to $(C+S)^2/100$, wherein C equals the weight percentage of CaO present and S equals the weight percentage of $SiO_2$,
   (e) there being from 95 to 99% MgO+CaO,
forming said batch into shapes, firing said shapes to obtain ceramically bonded, dense, hydration resistant, magnesia refractory shapes.

5. That method of obtaining high temperature strength in ceramically bonded magnesite refractories without sacrifice of hydration resistance consisting essentially of fabricating a refractory-brickmaking size graded batch of dead burned dense magnesite particles, said magnesite particles characterized by including at least some of each of the constituents CaO, $SiO_2$, $B_2O_3$, the remainder being $R_2O_3$ materials, said particles containing from 3 to 5% CaO, more than 1% $SiO_2$, and up to 3% $R_2O_3$ materials, the CaO:$SiO_2$ weight ratio being at least 2:1 and the maximum $B_2O_3$ percentage content being $(C+S)^2/100$, where C is the percentage of CaO and S is the percentage of $SiO_2$ in the grain, the particles being at least about 90% MgO, by weight, on an oxide basis, forming the batch into shaped refractories, firing the shaped refractories to obtain ceramically bonded, dense, hydration-resistant magnesia refractories.

6. A burned magnesite shape of dead burned synthetic magnesia grain, said grain including at least some of each of the materials, CaO, $SiO_2$, and $B_2O_3$,
  (a) said grain including up to 1% $SiO_2$ and,
  (b) up to 3% CaO, by weight,
  (c) the CaO:$SiO_2$ weight ratio being less than 3:1,
  (d) the maximum weight percentage $B_2O_3$ being equal to $(C+S)^2/100$, wherein C equals the weight percentage of CaO present and S equals the weight percentage of $SiO_2$, but there being less than 0.05% $B_2O_3$,
  (e) there being from 95 to 99% MgO+CaO,
  (f) the remainder being $R_2O_3$ materials.

7. The burned magnesite shape of claim 6 impregnated throughout with nonaqueous, cokable, carbonaceous material.

8. A burned magnesite shape of synthetic magnesia grain including at least some of each of the materials, CaO, $SiO_2$, and $B_2O_3$:
  (a) said grain including up to 1% $SiO_2$ and,
  (b) up to 3% CaO, by weight,
  (c) the CaO:$SiO_2$ ratio being less than 3:1,
  (d) there being $B_2O_3$ in the range 0.05 to 0.1% and the maximum percentage thereof being equal to the ratio of $(C+S)^2/100$, wherein C equals the weight percentage of CaO present and S equals the weight percentage of $SiO_2$,
  (e) there being from 95 to 99% MgO+CaO,
  (f) the remainder being $R_2O_3$ materials.

9. The burned magnesite shape of claim 8 impregnated throughout with nonaqueous, cokable, carbonaceous material.

10. That method of obtaining high temperature strength in ceramically bonded magnesite refractories without sacrifice of hydration resistance consisting essentially of fabricating a refractory-brickmaking size graded batch of dead burned dense magnesite particles, said magnesite particles characterized by including at least some of each of the constituents, CaO, $SiO_2$, $B_2O_3$, the remainder being $R_2O_3$ materials, said particles including essentially less than 0.05% $B_2O_3$, the remainder being MgO, $SiO_2$, $R_2O_3$, oxides, the total MgO in said refractories amounting to at least about 90% MgO, forming the batch into shaped refractories, firing the shaped refractories to obtain ceramically bonded, dense, hydration-resistant magnesia refractories.

11. In methods of making refractory shapes of dead burned magnesite grain, which grain includes at least some of each of the constituents, CaO, $SiO_2$, and $B_2O_3$, the grain including at least about 90% MgO, by weight, on an oxide basis, the improvement comprises maintaining the relationship of $B_2O_3$, CaO and $SiO_2$ so that $(C+S)^2/100$ is the maximum $B_2O_3$ percentage content wherein C is the weight percentage of CaO and S is the weight percentage of $SiO_2$, maintaining the CaO:$SiO_2$ weight ratio greater than 2:1 and maintaining the $SiO_2$ content greater than about 1%.

12. The method of claim 11 in which the brick is a chemically bonded brick.

13. The method of claim 11 in which the brick is a ceramically bonded brick.

14. The method of claim 13 in which the ceramically bonded brick is impregnated throughout with nonaqueous, cokable, carbonaceous material.

15. That method of obtaining high temperature strength in ceramically bonded magnesite refractories without sacrifice of hydration resistance, the refractories being made of synthetic grain containing at least some of each of the constituents, CaO, $SiO_2$, and $B_2O_3$, amounting to at least 90%, by weight, the CaO to $SiO_2$ weight ratio being less than 3:1, the maximum $SiO_2$ content being 2%, the improvement comprising maintaining the percentage $B_2O_3$ sufficiently low to assure good modulus of rupture at 2600° F.

References Cited by the Examiner

UNITED STATES PATENTS

| | | | |
|---|---|---|---|
| 2,804,373 | 8/1957 | Dancy | 23—201 |
| 2,823,134 | 2/1958 | Atlas | 23—201 |
| 2,957,752 | 10/1960 | Gloss | 23—201 |
| 3,106,475 | 10/1963 | Davies et al. | 106—58 |
| 3,141,790 | 7/1964 | Davies et al. | 106—58 |

TOBIAS E. LEVOW, *Primary Examiner.*

J. E. POER, *Assistant Examiner.*

UNITED STATES PATENT OFFICE
CERTIFICATE OF CORRECTION

Patent No. 3,275,461                        September 27, 1966

Ben Davies et al.

It is hereby certified that error appears in the above numbered patent requiring correction and that the said Letters Patent should read as corrected below.

Column 9, line 4, for "beingfi" read -- being --; column 10, line 29, after "$B_2O_3$," insert -- the MgO --.

Signed and sealed this 22nd day of August 1967.

(SEAL)
Attest:

ERNEST W. SWIDER                      EDWARD J. BRENNER
Attesting Officer                        Commissioner of Patents